(12) United States Patent
Sherwood

(10) Patent No.: US 7,732,044 B2
(45) Date of Patent: *Jun. 8, 2010

(54) FOAM CORE-SURFACE REINFORCED ARTICLE AND METHOD

(75) Inventor: Kent Sherwood, Malibu, CA (US)

(73) Assignee: Foam Matrix, Inc., Inglewood, CA (US)

( * ) Notice: Subject to any disclaimer, the term of this patent is extended or adjusted under 35 U.S.C. 154(b) by 1536 days.

This patent is subject to a terminal disclaimer.

(21) Appl. No.: 10/235,480

(22) Filed: Sep. 4, 2002

(65) Prior Publication Data

US 2004/0043181 A1    Mar. 4, 2004

(51) Int. Cl.
*B32B 5/26* (2006.01)

(52) U.S. Cl. .................. 428/309.9; 428/71; 428/76; 428/306.6; 428/316.6; 442/224

(58) Field of Classification Search .................. 428/71, 428/76, 309.9, 306.6, 316.6; 442/224
See application file for complete search history.

(56) References Cited

U.S. PATENT DOCUMENTS

| | | | |
|---|---|---|---|
| 3,873,654 A | * | 3/1975 | Smith .................. 264/258 |
| 4,510,105 A | | 4/1985 | Sherwood |
| 4,664,974 A | | 5/1987 | Sherwood |
| 5,112,663 A | * | 5/1992 | Morenz et al. .................. 428/71 |
| 6,355,339 B1 | * | 3/2002 | Sherwood .................. 428/309.9 |

* cited by examiner

*Primary Examiner*—Hai Vo
(74) *Attorney, Agent, or Firm*—Leon D. Rosen

(57) ABSTRACT

A surface-reinforced article includes a core assembly (12) comprising a foam core (20) with a surface region (22) that includes fine inner fibrous material intimately surround by foam that is integral with foam of the core, and an outer reinforcing covering (14) which includes an outer layer (32) of fibrous material and a resin (30) surrounding the outer layer of fibrous material and covering the primarily foam core assembly. The fine inner fibrous material (91-94) includes coupling fibers (100) with inner ends (102) embedded in the foam and outer ends (106) embedded in the resin, to better hold the resin to the foam. The primarily foam core assembly is molded within a first mold cavity (64) formed between spacers (60, 62) that lie within a second mold cavity (50). After the core assembly is molded, the spacers are removed, the core assembly is wrapped in the outer fibrous material, and the wrapped core assembly (120) is placed in the second mold cavity that is formed by the original mold but without the spacers. When resin is injected into the second mold cavity it forms an outer reinforcing covering of largely uniform thickness. The fine fiber reinforcement of the core assembly prevents it from being deformed at the pressure of the injected resin.

5 Claims, 3 Drawing Sheets

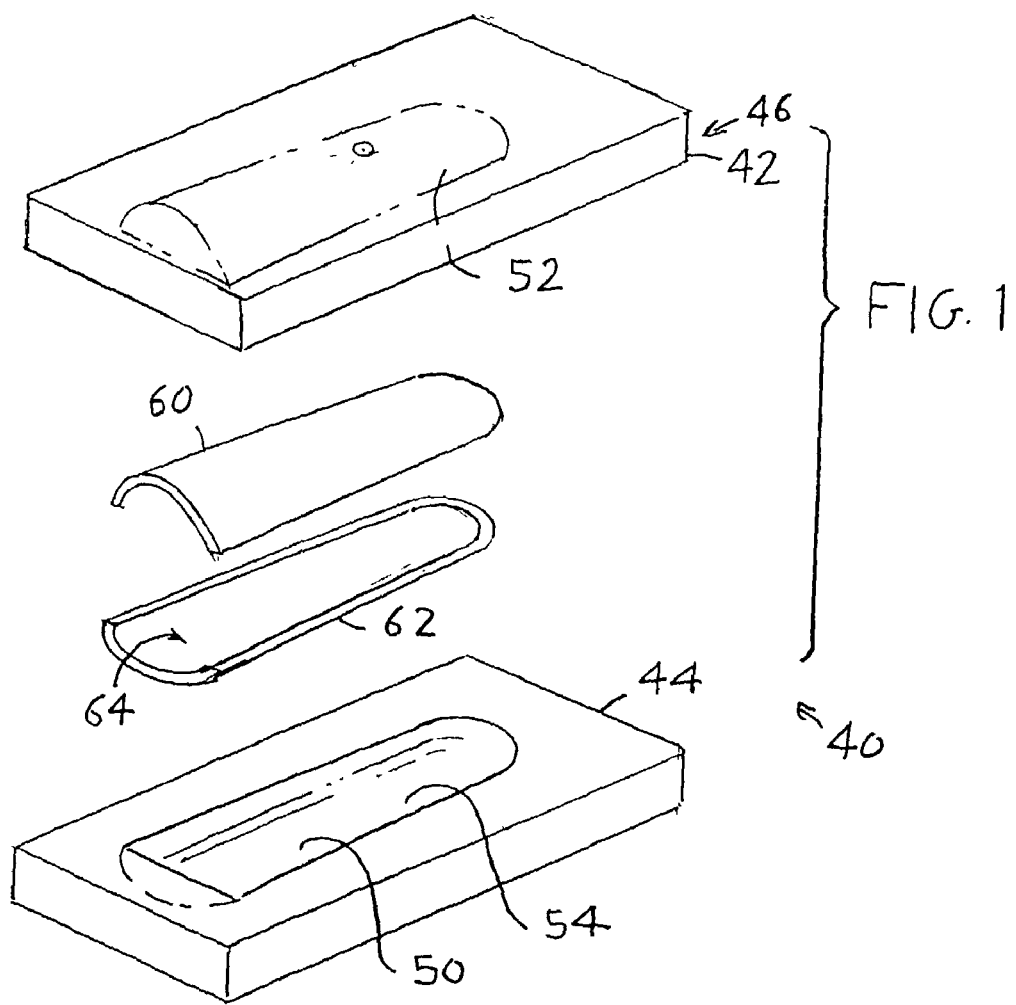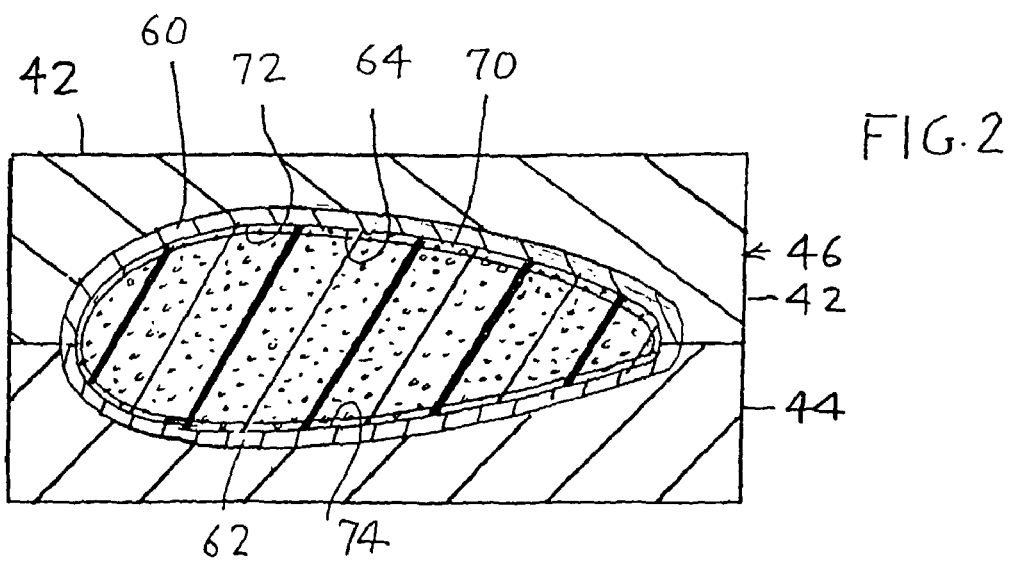

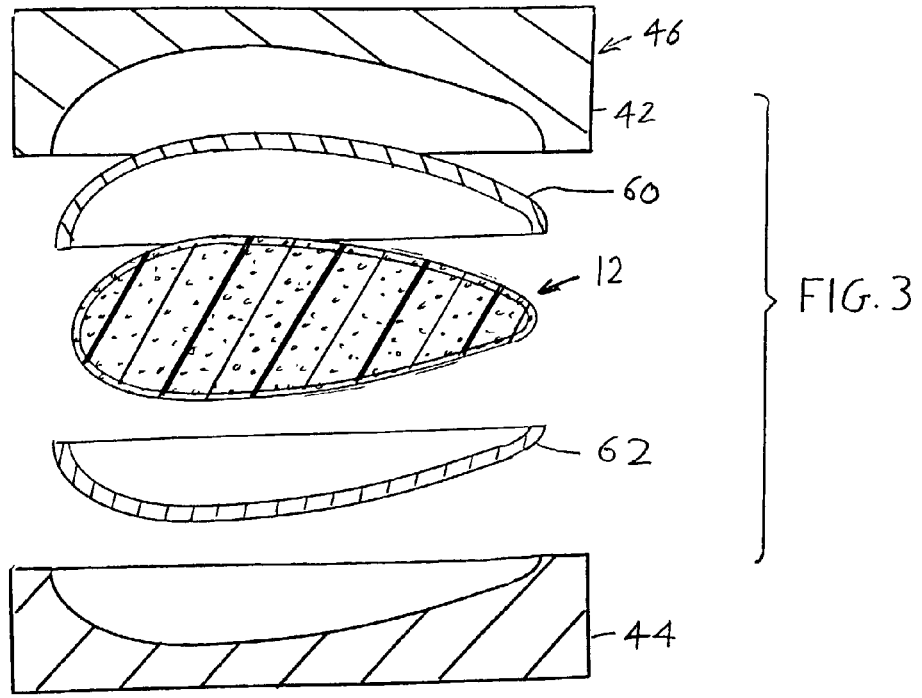
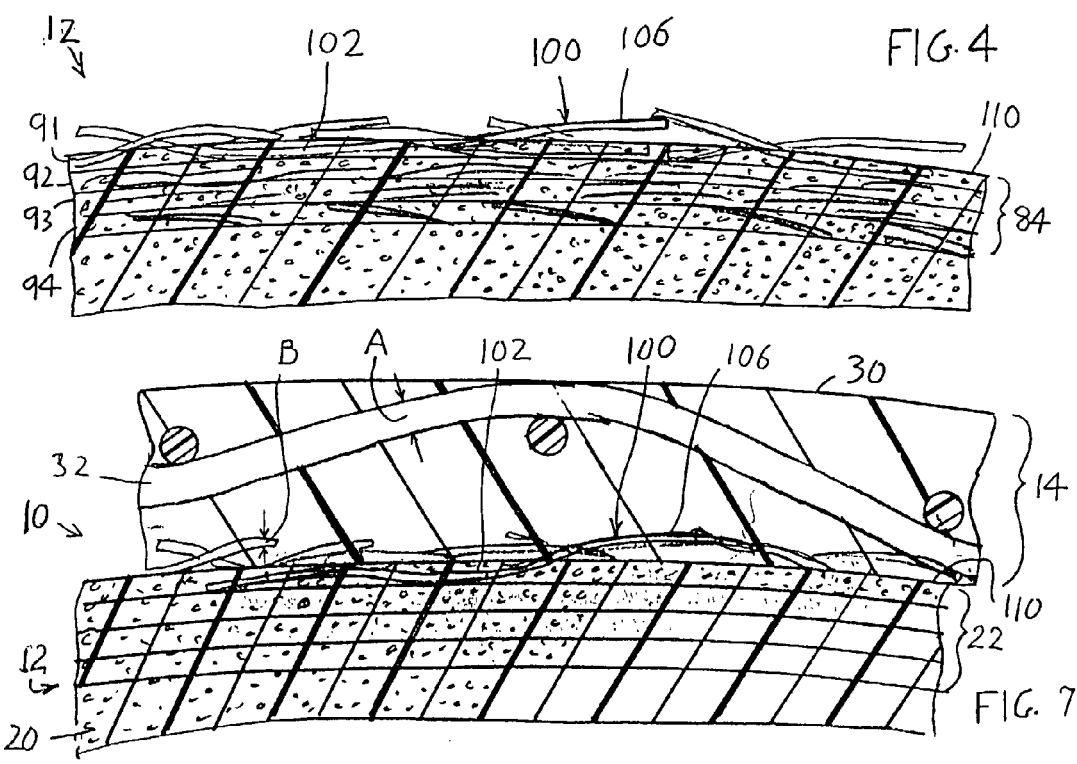

FOAM CORE-SURFACE REINFORCED ARTICLE AND METHOD

BACKGROUND OF THE INVENTION

My earlier U.S. Pat. No. 4,664,974 describes a lightweight article formed by foam with fibers embedded in a surface region of the foam article to strengthen the surface region and produce a stronger article with almost the same weight as one solely of foam.

Such surface-reinforced foam article is suitable for surfboards and a variety of other articles of light weight compared to their size. There are other applications where a light weight article is required which is of much greater strength than the article of foam with embedded fibers at the surface. Such article and a method for efficiently producing it would be of value.

SUMMARY OF THE INVENTION

In accordance with one embodiment of the present invention, a surface-reinforce article and method for producing it are provided which results in a low cost, light weight, and high strength article. The article includes a core assembly which includes a core of foam material with a surface region reinforced by inner fibrous material embedded in the foam as a result of molding the foam so it penetrates through layers of inner fibrous material. The article also includes an outer reinforcing covering which includes outer fibrous material embedded in resin which surrounds the core assembly.

Fibers of the inner fibrous material include coupling fibers with inner portions embedded in the foam and outer portions embedded in the resin. The inner fibrous material therefore serves to securely hold the resin to the foam. A major purpose of the first fibrous material is to strengthen the surface of the core assembly so it will not deflect much when resin at a pressure of a plurality of psi is injected into a mold containing the core assembly. The purpose of the fiber-reinforced resin covering is to greatly strengthen the surface of the final article.

A method for constructing the article includes placing spacer layers against inside molding walls of a mold to create a first cavity within the spacers. Inner fibrous material is placed on the inside surfaces of the spacers, and the foam core assembly is formed within the spacers. Then, the spacers and foam core assembly are removed and an outer fibrous material is wrapped around the core assembly. The core assembly with wrapped fiber is then placed in the original mold, but without the spacers, so as to form a second cavity larger than the first cavity that formed only the core assembly. The mold is closed and resin is injected under pressure into the second cavity to fill the space between the outside of the core assembly and the inside of the second mold cavity which is partially occupied by the outer fibrous material. The resin is then cured while in the mold, to produce the final article wherein fiber-reinforced resin surrounds a core assembly to produce an article of high strength.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a mold assembly that is useful in the production of the surface-reinforced article of other present invention.

FIG. 2 is a sectional view of the mold of FIG. 1, showing how the core assembly is molded therein, in accordance with one step of the method of the present invention.

FIG. 3 is an exploded sectional view showing the parts of FIG. 2 after the core assembly has been molded and is being removed.

FIG. 4 is an enlarged sectional view of a portion of the core assembly of FIG. 3.

FIG. 7 is an enlarged sectional view of a portion of the final article.

DESCRIPTION OF THE PREFERRED EMBODIMENTS

Figure 8:
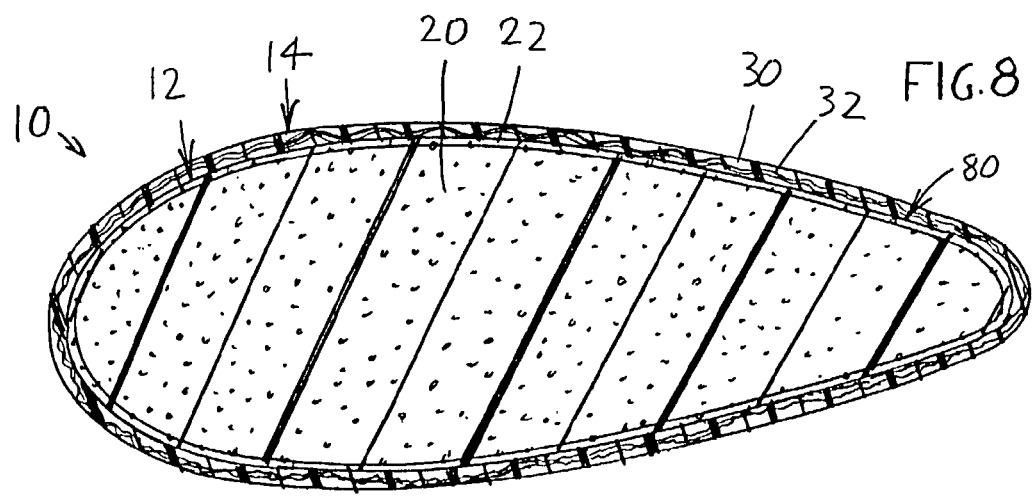
FIG. 8 is a sectional view of a final article of the invention.

FIG. 8 illustrates a surface-reinforced article 10, such as an aircraft wing or tail, which includes a core assembly 12 and a reinforcing covering 14 around the core assembly. The core assembly includes a core 20 of foam with a surface region 22 that is reinforced by first or inner layers of fibrous material. The covering 14 includes a resin 30 and a second or outer layer 32 of fibrous material that reinforces the resin. The fiber-reinforced resin covering greatly reinforces the core assembly 12 to produce an article that is of light weight and high strength.

The core assembly 12 is largely similar to the surface-reinforced foam article described in my earlier U.S. Pat. No. 4,664,974 wherein the article was formed of foam with the surface regions reinforced by fibrous material, including fine fibers which facilitated molding, and with or without stronger fibers such as a fiber glass that can add strength. The present article 10 has greater strength because of the high strength of the reinforced resin covering 14 which surrounds the primarily foam core assembly 12.

FIG. 1 illustrates a mold assembly 40 which applicant uses to form the surface reinforced article. The mold assembly includes upper and lower mold halves 42, 44 of a mold 46. The mold forms a second cavity 50 having upper and lower second cavity halves 52, 54. The mold assembly also includes a pair of spacer layers or spacers 60, 62 which form a first mold cavity 64 between them.

FIG. 2 shows a first step in the fabrication of the final article, which includes placing the spacers 60, 62 within the mold 46. Before the mold is closed, and after the spacers are placed in the mold, first or inner fibrous material 70 is placed against the inner surfaces of the spacers, which form the first mold cavity 64. Applicant does not rely upon the inner fibrous material 70 to provide much of the strength of the final article.

A next step before the mold is closed is to place a quantity of foamable material on the lower spacer 62 and immediately close the mold by placing the upper mold half 42 with the spacers and fibrous material thereon over the lower half of the mold to close it. With the upper and lower mold halves clamped together, the foamable material is allowed to foam and expand in volume until it substantially fills the first mold cavity 64. As described in my earlier U.S. Pat. No. 4,664,974, the layers of first fibrous material 70 slow the expansion of the foam since the foam can flow only very slowly through the fine inner fibrous material because there are only very small pores between adjacent fibers. This greatly slows the expansion of the foam. The amount of foamable material placed in the first cavity 64 is chosen so the foamable material will flow through some of the inner fibrous material 70 but not all of it. As a result, there generally will not be foam material adhering to the surfaces 72, 74 of the spacers. This is desirable because the foamable material is difficult to remove from most other materials, and enables the use of a moderate cost material for the spacers.

FIG. 3 shows the mold halves 42, 44, spacers 60, 62 and surface-reinforced core assembly 12 separated. It is noted that the core assembly 12 will initially include at least one layer of fine fibrous material that has been penetrated by the foam, with other non-penetrated layers removed as by sanding.

FIG. 4 is a greatly enlarged sectional view of a portion of the core assembly 12 showing the foam core 20 and the fiber-reinforced surface region 22. It can be seen that the surface region includes a plurality of first layers 91-94 of a fine fibrous material. The number of layers required is generally dependent on how accurately a technician can predict that the expanding foam will penetrate through the first layers. Any additional first layers that have not been penetrated have been removed. It can be seen that the outermost first layer 91 has fine fibers 100 that form coupling fibers, with an inner portion 102 of each coupling fiber embedded in the foam 104 and with an outer portion 106 lying free at the surface 110 of the foam. These coupling fibers 100 help to anchor resin in an outer reinforcing covering to the core assembly 12.

FIG. 8 shows the completed surface-reinforced article 10, which includes the core assembly 12 and the reinforced covering 14 that lies around the outer surface 110 of the core assembly. The covering 14 includes resin 30 and a second or outer layer 32 of fiber. Although resin such as epoxy, is a strong material that can be injection molded at a low temperature and cured by heat at a moderate temperature, resins generally do not bond well to solidified foam. However, the presence of the outer portions 106 of the coupling fibers 100 enables those fibers to be embedded in the resin and thereby securely hold the resin to the foam core assembly. It is important that there be intimate holding of the resin covering to the core assembly to prevent any sliding between them, which would greatly weaken the article.

Figure 5:
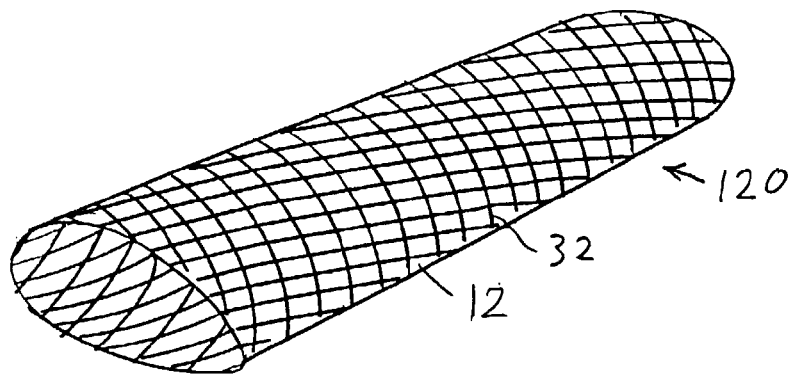
FIG. 5 is an isometric view of the core assembly of FIG. 3 after it has been wrapped in the outer layer of fibrous material.
Figure 6:
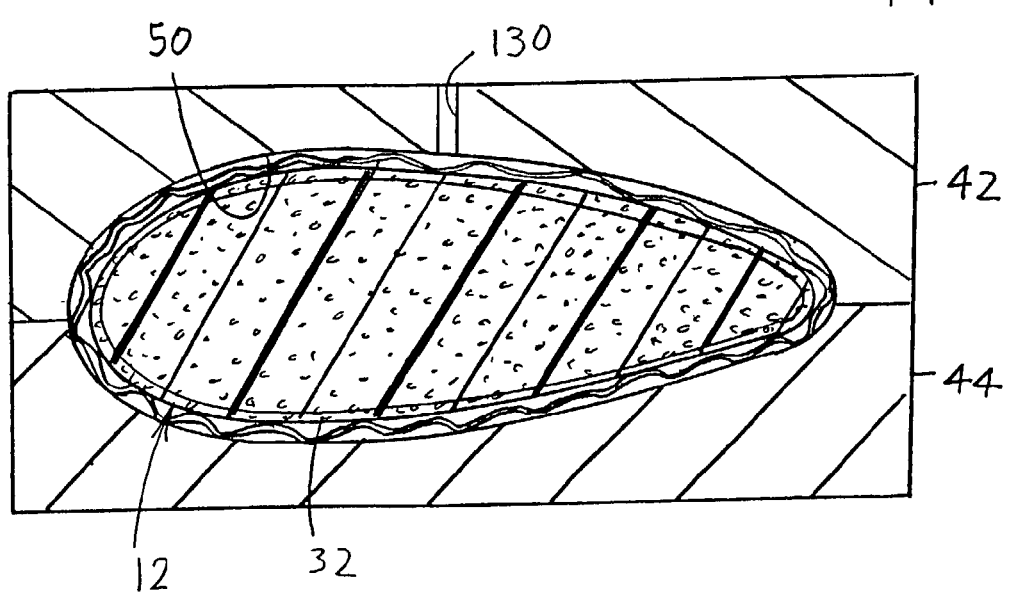
FIG. 6 is a sectional view showing the fiber-wrapped core assembly of FIG. 5 in the mold of FIG. 3, but without the spacers, so resin can be injected and cured to complete fabrication of the article.

After the core assembly 12 of FIG. 3 is removed from the mold, the core assembly is wrapped within the second or outer layer 32, as shown in FIG. 5. The outer layer can include a plurality of fibrous layers. The wrapped outer fibrous layer tends to engage the core assembly 12, and is resiliently depressable. The wrapped core assembly 120 of FIG. 5 is placed in the second mold cavity 50 as shown in FIG. 6, with the core assembly 12 spaced from the walls of the second cavity 50 by the outer fiber layer 32 contacting both the core assembly and the walls of the cavity 50. The cavity 50 represents the mold without the spacer layers 60, 62 shown in FIGS. 2 and 3.

After the mold halves 42, 44 have been assembled and tightly clamped together, resin is injected into the mold cavity through an opening 130. Resins such as epoxy have a high viscosity, and therefore are preferably injected under a pressure of a plurality of psi (pounds per square inch), preferably 5 to 50 psi. For an article having an average width of one foot and a length of 5 feet, resulting in top and bottom areas that are each 720 inches$^2$, a pressure of 20 psi results in a force of about 1,400 pounds against the article. Although this force is evenly distributed, it could result in substantial compression of a core composed only of foam. The presence of the fibrous inner layers 91, 94 at the surface of the foam, strengthen the foam surface against deflection, so the shape of the final core assembly and amount of resin is closely controllable.

It is noted that in most cases the covering 14 has a largely uniform thickness, which is achieved by the spacers 60, 62 which are of largely uniform thickness and the inner fiber reinforcement at the surface of the core assembly which resist compression of the core assembly. It is noted that in some cases holes or projections are required in the final article, which can be accomplished by cores and embedded flanges, etc. It would be possible to position several small spacer elements between the core assembly and the walls of the second cavity, other than the outer fibrous material.

The second or outer layer of fibrous material 32 shown in FIG. 7 serves to strengthen the largely resin outer covering 14. Applicant prefers to use fibrous material of high strength, such as carbon fibers, fiberglass or Kevlar, which is preferably woven into a cloth, but which can be used as a matt. This contrasts with the thin inner fibers of the surface region 32 of the core assembly.

In one example, the final surface reinforced article 10 of FIG. 8 is an airfoil having a width of one foot, a length of five feet, and a maximum thickness of 4.5 inches. The first or inner fibrous layers 91-94 are formed by four layers of tissue paper sheets, each of about 2 mil thickness (1 mil equals 0.001 inch), with a few more layers of tissue originally used in the molding and only about four remaining in the final core assembly. The second or outer fibrous layer 70 is formed by sheets of a higher strength material such as fiberglass, Kevlar, or carbon fibers, and the resin layer is epoxy and has a thickness of 0.25 inch. The fibers of the outer reinforcing layer in combination with the resin, have a thickness A (FIG. 7) and have a tensile strength more than ten times that of the first or inner fibers. After the final article with a fiber-reinforced resin covering is removed, it may be painted, etc., but such coverings do not significantly affect the strength of the article.

If the surface-reinforced core assembly were stiff enough and strong enough for the purposes of the article, then there would be no need for the fiber-reinforced covering (14). The purpose of the reinforced covering (14) is to add strength and stiffness even through it adds some weight. Therefore, the reinforcing covering of epoxy resin and higher strength material such as fiberglass, Kevlar, or carbon fibers embedded in the resin, has a greater stiffness per unit volume than the fiber-reinforced surface region 22 of the core assembly which includes five filers embedded in foam.

Thus, the invention provides a surface-reinforced foam core article and method for forming it, which provides an article of high strength and moderately light weight, which can be manufactured with minimum equipment and with assurance of uniformity of thickness of various layers of the article. The article includes a core assembly comprising a body of foam with a surface portion that is preferably reinforced by inner fibers. The inner fibers can be fine fibers that serve to limit the expansion of foam to avoid the foam contacting the walls of the first cavity. The inner fibrous layers also strengthens the surface region of the core assembly to minimize inward deflection under the pressure of pressure-injected resin. The inner fibers include coupling fibers with inner portions embedded in the foam and outer portions that become embedded in the resin covering. The covering layer includes a resin that is preferably reinforced by outer fibrous material, and the outer fibrous material has fibers of much greater strength than the fibers of the inner fibrous material that reinforces the surface of the core assembly. The article is molded by first molding the core assembly in a mold that includes spacers lying within a mold, to form a core assembly of a size and shape that results in a largely uniform space between the outside of the core assembly and the inside of a second cavity which is formed when the spacers are removed.

The removed core assembly is wrapped in the second or outer fibrous material and placed in the original mold, but without spacers, the resilient wrapped second fibrous layers then serving as a spacer. Resin is injected into the second cavity to fill the space between the outside of the core assembly and the inside walls of the second cavity, which are originally occupied only by the outer fibrous material.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A surface-reinforced article, comprising: a core assembly which includes a core of unreinforced foam material and a first surface region which includes at least one inner layer of inner fibrous material impregnated with the same foam material as said core, said foam material which impregnates said inner layer of fibrous material being integral with the foam material in said core;
    an outer reinforcing covering which includes at least one outer layer of outer fibrous material lying around said core assembly and resin which impregnates said outer reinforcing covering by surrounding said outer layer of fibrous material and forming a continuous layer, said resin being bound to said core assembly by molding said resin to said core assembly;
    said outer reinforcing covering having a greater stiffness per unit volume than said first surface region of said core assembly, and said first surface region of said core assembly having a greater stiffness per unit volume than said core of unreinforced foam of said core assembly;
    said inner layer of fibrous material includes multiple coupling fibers with inner portions surrounded by said foam material and with outer portions that project outside said foam material;
    said outer portions of said coupling fibers are embedded in said resin, to thereby securely hold said covering to said core assembly.

2. A surface-reinforced article, comprising: a core assembly which includes a core of unreinforced foam material and a first surface region which includes at least one inner layer of inner fibrous material impregnated with the same foam material as said core, said foam material which impregnates said inner layer of fibrous material being integral with the foam material in said core;
    an outer reinforcing covering which includes at least one outer layer of outer fibrous material lying around said core assembly and resin which impregnates said outer reinforcing covering by surrounding said outer layer of fibrous material and forming a continuous layer, said resin being bound to said core assembly by molding said resin to said core assembly;
    said outer layer of fibrous material of said outer covering consists of fibers whose average tensile strength is a plurality of times that of the average strength of the fibers of said at least one inner layer, said fibers of said at least one inner layer being less rigid than the fibers of said outer covering;
    said outer reinforcing covering having a greater stiffness per unit volume than said first surface region of said core assembly, and said first surface region of said core assembly having a greater stiffness per unit volume than said core of unreinforced foam of said core assembly.

3. The article described in claim 2 wherein:
    said fibers of said outer layer of fibrous material, are formed of material of greater tensile strength per unit of cross-sectional area than the material of said fibers of said at least one inner layer.

4. A surface-reinforce article comprising a core assembly which includes a primarily unreinforced foam core, and a resin covering that extends around said core assembly, said resin covering including at least one layer of second fibrous material and a quantity of resin that encapsulates said second fibrous material and that bonds to said core assembly, wherein:
    said core assembly has a surface region that includes a multiplicity of first fibers that are at least partially encapsulated by the foam of said core assembly, and said resin is molded against said core assembly;
    said multiplicity of first fibers includes a multiplicity of coupling fibers that each has an inner portion embedded in said foam and an outer portion embedded in said resin;
    said resin covering having a greater stiffness per unit volume than said surface region of said core assembly, and said surface region of said core assembly having a greater stiffness per unit volume than primarily unreinforced foam core.

5. A surface-reinforce article comprising a core assembly which includes a primarily unreinforced foam core, and a resin covering that extends around said core assembly, said resin covering including at least one layer of second fibrous material and a quantity of resin that encapsulates said second fibrous material and that bonds to said core assembly, wherein:
    said core assembly has a surface region that includes a multiplicity of first fibers that are at least partially encapsulated by the foam of said core assembly, and said resin is molded against said core assembly;
    said resin covering having a greater stiffness per unit volume than said surface region of said core assembly, and said surface region of said core assembly having a greater stiffness per unit volume than primarily unreinforced foam core;
    the fibers of said second fibrous material have at least twice the tensile strength of said first fibers.

* * * * *